Figure 6:
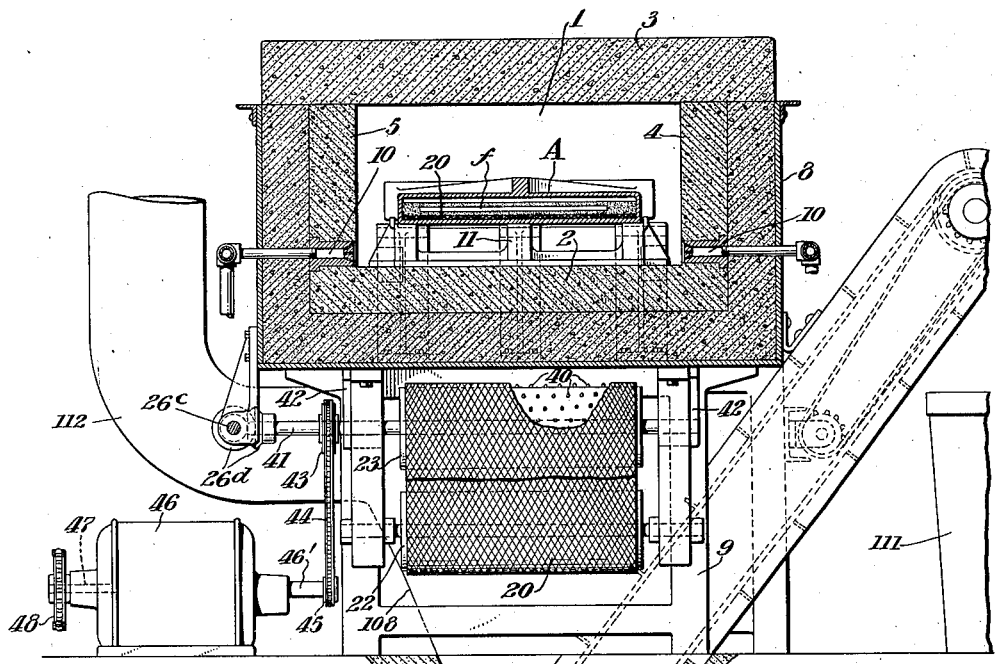

Feb. 10, 1931.  C. T. WILLARD ET AL  1,792,456
METAL TREATING FURNACE
Filed Feb. 23, 1929   6 Sheets-Sheet 1
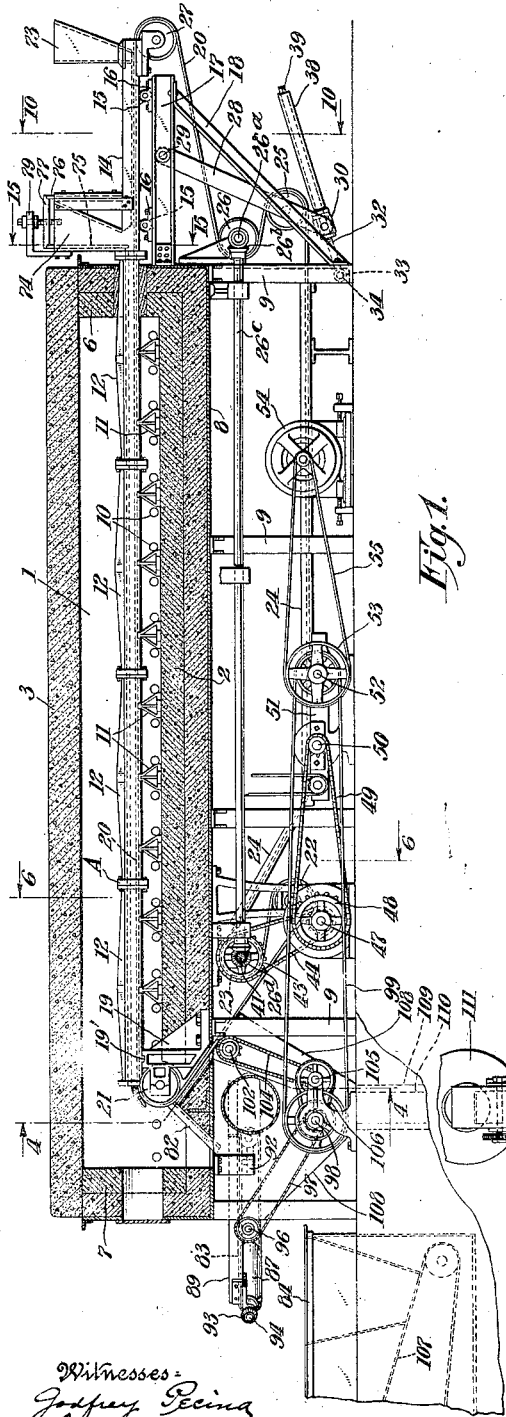
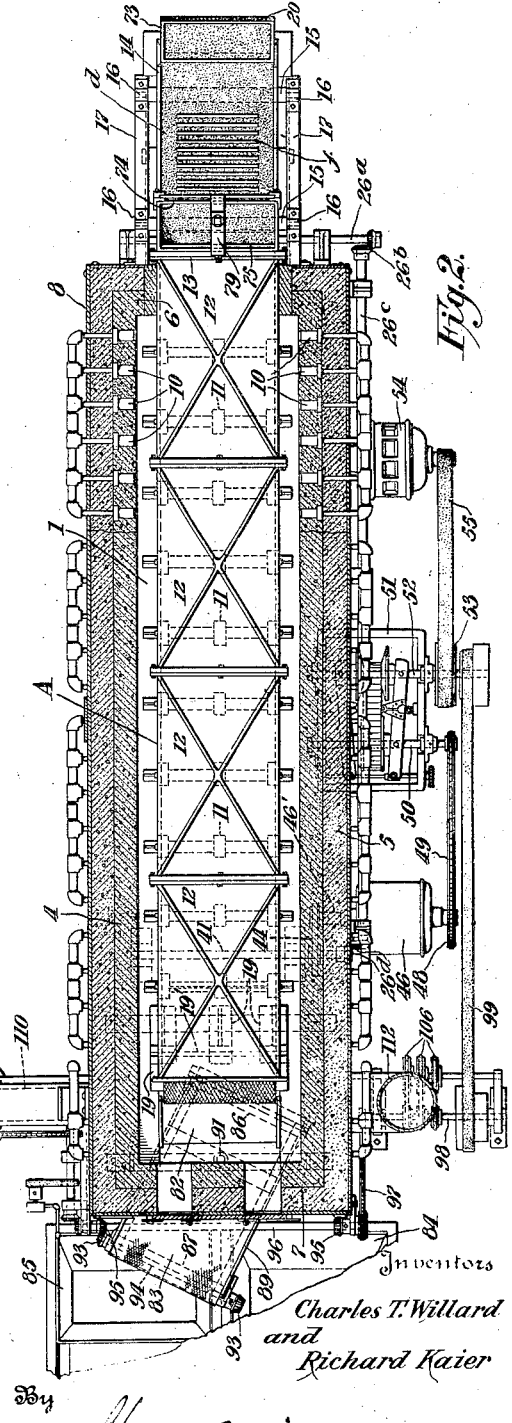
Inventors
Charles T. Willard
and
Richard Kaier

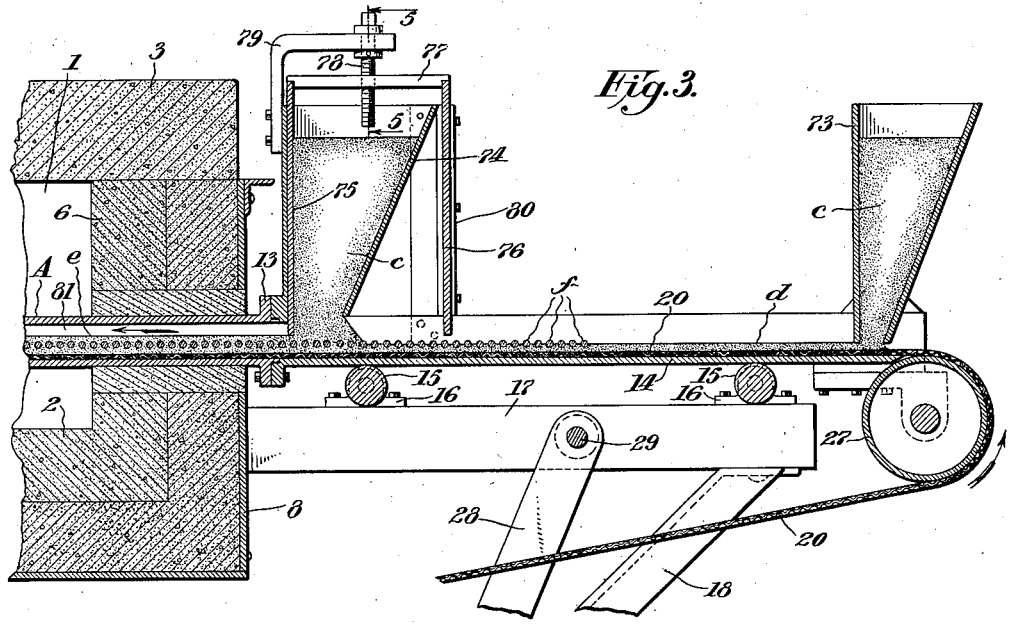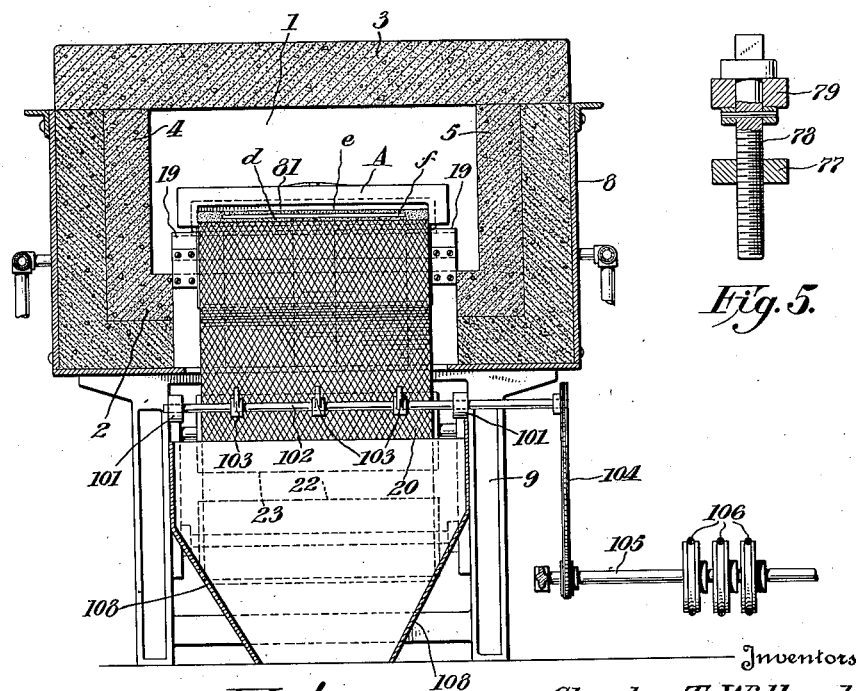

Inventors
Charles T. Willard
and Richard Kaier

Feb. 10, 1931. C. T. WILLARD ET AL 1,792,456
METAL TREATING FURNACE
Filed Feb. 23, 1929. 6 Sheets-Sheet 4
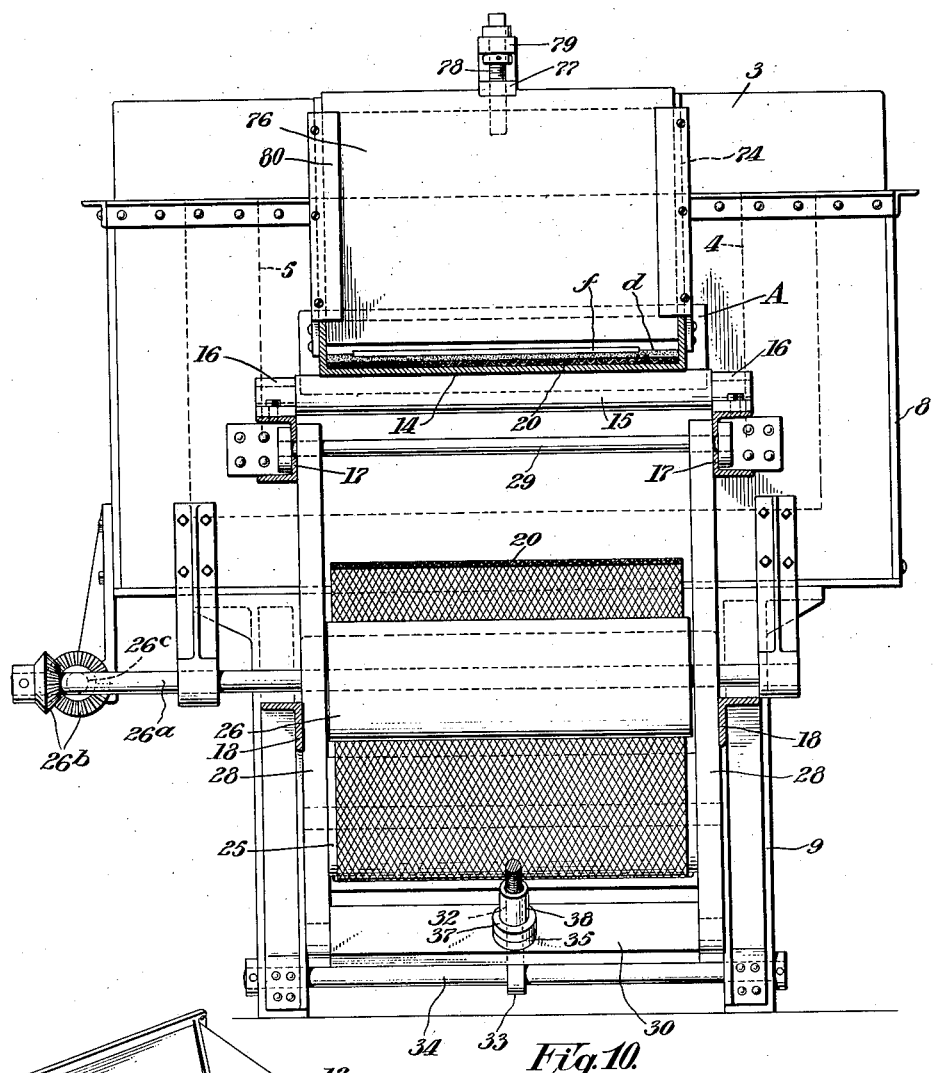
Fig. 10.
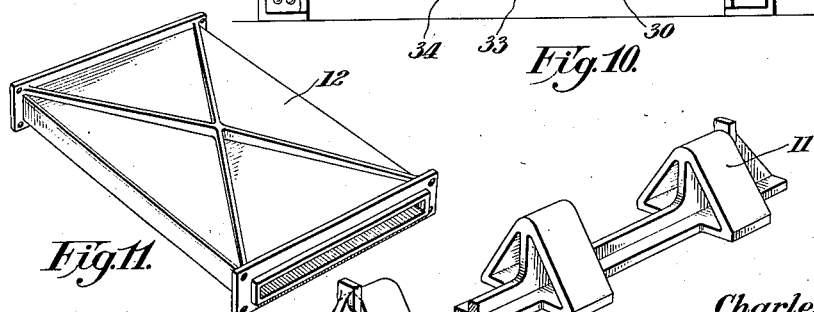
Fig. 11.
Fig. 12.
Witnesses:
Inventors
Charles T. Willard
and Richard Kaier
By Henry J. Miller
Attorney

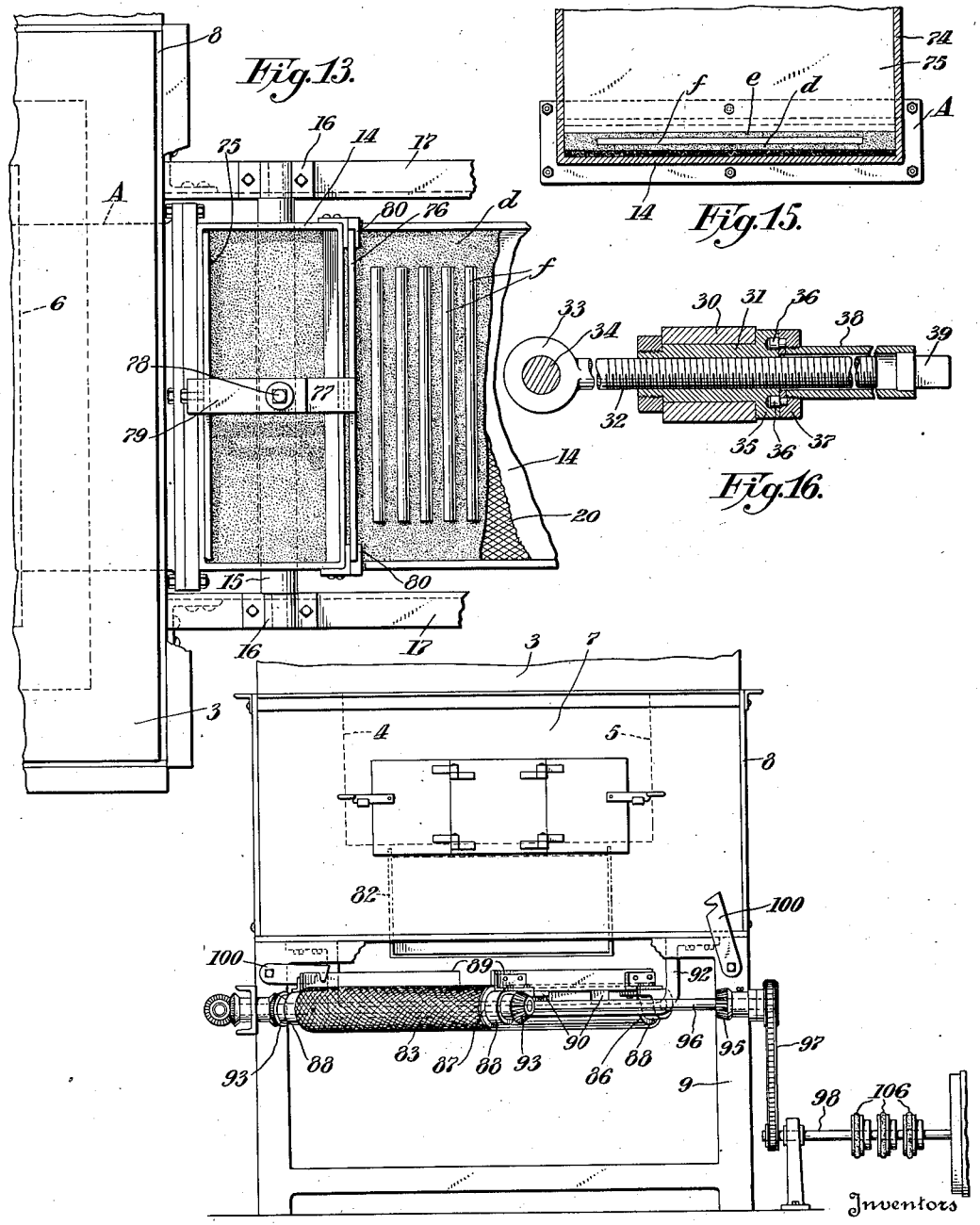

Feb. 10, 1931. C. T. WILLARD ET AL 1,792,456
METAL TREATING FURNACE
Filed Feb. 23, 1929  6 Sheets-Sheet 6
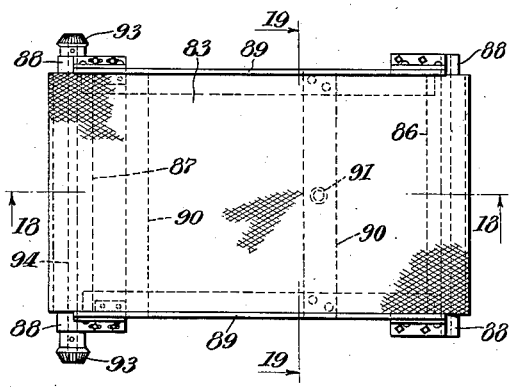
Fig.17.
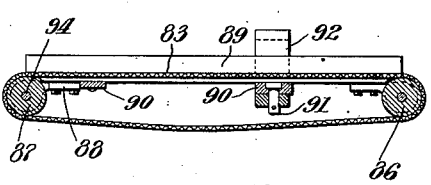
Fig.18.
Fig.19.
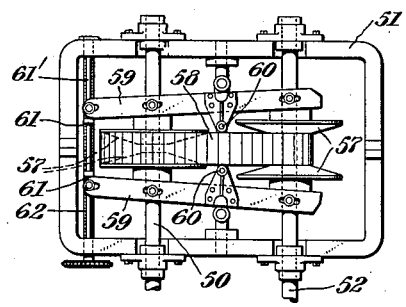
Fig.20.
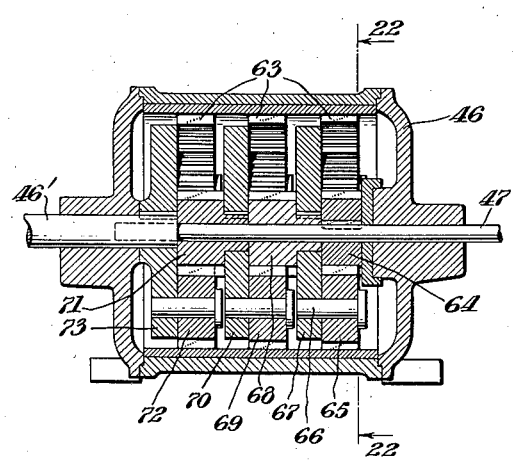
Fig.21.
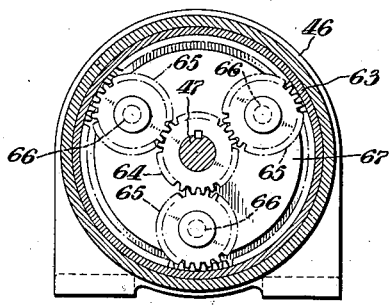
Fig.22.
Inventors
Charles T. Willard
and Richard Kaier Patented Feb. 10, 1931

1,792,456

UNITED STATES PATENT OFFICE

CHARLES T. WILLARD, OF ROSELLE, AND RICHARD KAIER, OF CRANFORD, NEW JERSEY, ASSIGNORS TO THE SINGER MANUFACTURING COMPANY, OF ELIZABETH, NEW JERSEY, A CORPORATION OF NEW JERSEY

METAL-TREATING FURNACE

Application filed February 23, 1929. Serial No. 342,057.

This invention relates to furnaces for the heating of metal parts or articles and, more particularly, to furnaces wherein the metal parts are subjected to heat while buried in a finely divided, granular or powdered envelope which may be either an inert material or an active material chosen to affect the metal parts. More specifically, the invention relates to furnaces for the carburization of steel parts by use of a finely divided carburizer.

It has been the practice heretofore to pack the steel parts or work-pieces with the usual carburizing compound in covered cast-metal pots or work-boxes, a batch of which were placed in a furnace and heated to and held at the desired carburizing temperature for the requisite time, at the expiration of which the work-boxes were removed from the furnace and dumped and allowed to cool before being re-packed. This practice necessitated the attention of several operatives, for example, one to pack the cold work-boxes, and others to attend to the removal of the work from the furnace; one operative removing a box, another removing the box-cover, while the first dumps the box-contents into a sieve manipulated by a third operative who shakes the sieve, allowing the spent compound to pass through, and dumps the work remaining on the sieve into an oil bath. In addition to the labor of several operatives, this practice necessitates the provision of several batch-furnaces which occupy considerable floor space. Furthermore, considerable heat is lost due to the necessity of allowing the work-boxes to cool before re-packing them.

Where, as heretofore, the work-pieces have been packed with the carburizing compound in a pot and heated in a furnace, there is apt to be a lack of uniformity in the resultant product; the tendency being for the work-pieces nearer the sides of the pot to be heated more rapidly than those nearer the center of the pot, whereby all of the work-pieces are not subjected to the same temperature for the same length of time.

The present invention has for an object to provide a metal-treating furnace whereby a material saving may be effected in labor, floor-space and fuel. Another object of the invention is to provide a furnace whereby a high degree of uniformity in the treatment of the work-pieces is secured. A further object of the invention is to provide a furnace wherein the work-pieces are heated to a desired temperature in a granular or powdered envelope, protected from the surrounding atmosphere, without the necessity of packing them in covered pots or containers. Still further, the invention has for an object to provide a furnace of the class described which is continuous in its operation, requiring a minimum of attention by operatives. Further objects of the invention will appear from the following description and claims.

In accordance with the present improvement, the furnace comprises a tubular retort, preferably of flat rectangular cross-section and preferably disposed within a suitable heating chamber. The receiving end or mouth of the retort is preferably of restricted height as compared to the height of the retort passageway. A loading platform is preferably provided externally of the heating chamber, in advance of the mouth of the retort, the platform preferably having bottom and side walls forming continuations of the bottom and side walls of the retort passageway. Conveying means, preferably of the endless belt type, is arranged to run over the loading platform and through the retort; suitable screening and quenching means being preferably provided at the discharge end of the retort. The conveyor, if of the endless belt type, is preferably made of open mesh wire-fabric, the wire used being of suitable heat-resisting metal or alloy, for example, one of the well known nickel-chromium alloys.

At the loading platform there are preferably provided spaced hoppers for depositing base- and cover-layers of the finely divided material or carburizing compound upon the conveyor; the articles to be treated or carburized being placed or arranged by hand upon the base-layer before the cover-layer is applied. The base-layer preferably fills the interstices in the belt-conveyor, with preferably an excess sufficient to prevent actual contact of the work-pieces with the conveyor when they are placed upon the base-layer. The traveling parts, including the conveyor, base- and cover-layers with the work-pieces buried therein, entirely fill the restricted mouth of the retort and form a substantially gas-tight seal, so that any gases which may be liberated within the retort pass out through the gas-passageway formed at the top of the retort because of the restricted retort-mouth, and escape at the discharge end of the retort.

The conveyor is preferably driven continuously at a slow speed; the temperature of the retort and the time of passage of the work through the retort being regulated in accordance with the results desired, as will be readily understood by those skilled in the art. The work-pieces, being packed in a comparatively thin layer of material, are raised uniformly to the desired temperature in a given time after they enter the furnace.

Figures 7, 8, 9:
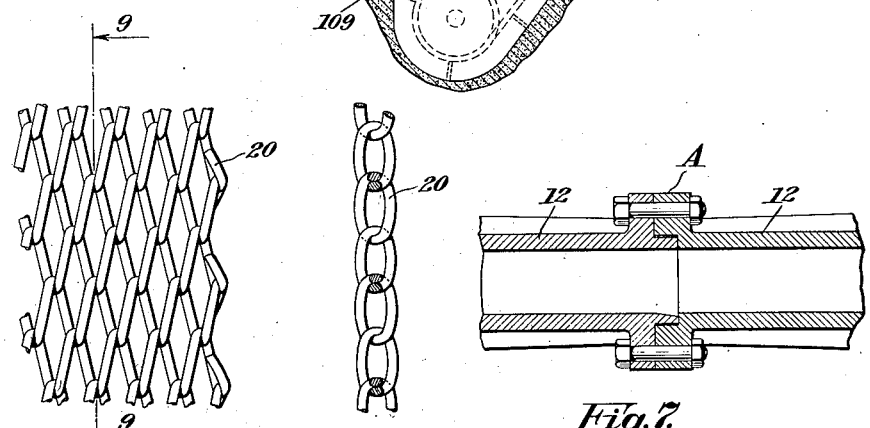

The invention will be better understood by referring to the accompanying drawings in which Fig. 1 is a longitudinal vertical section through a furnace embodying the invention. Fig. 2 is a horizontal section through the furnace. Fig. 3 is a longitudinal vertical section through the loading platform at the receiving end of the furnace. Fig. 4 is a section on the line 4—4, Fig. 1. Fig. 5 is a section on the line 5—5, Fig. 3. Fig. 6 is a section on the line 6—6, Fig. 1. Fig. 7 is an enlarged fragmentary longitudinal vertical section through the furnace-retort. Fig. 8 is a fragmentary plan view of the conveyor. Fig. 9 is a section on the line 9—9, Fig. 8.

Fig. 10 is a section on the line 10—10, Fig. 1. Fig. 11 is a perspective view of one of the retort sections. Fig. 12 is a perspective view of one of the retort supports. Fig. 13 is a fragmentary plan view of the loading platform at the loading end of the furnace. Fig. 14 is a rear end elevation of the furnace. Fig. 15 is a section on the line 15—15, Fig. 1. Fig. 16 is a longitudinal section through the slack take-up for the conveyor. Fig. 17 is a plan view of the screening device at the discharge end of the furnace. Fig. 18 is a section on the line 18—18, Fig. 17. Fig. 19 is a section on the line 19—19, Fig. 17. Fig. 20 is a plan view of the speed-adjuster used in the furnace-conveyor driving mechanism. Fig. 21 is a longitudinal vertical section through the speed-reducer used in the driving mechanism and Fig. 22 is a section on the line 22—22, Fig. 21.

The furnace, according to the preferred embodiment illustrated, comprises an elongated rectangular or boxlike heating chamber 1 having a bottom wall 2, top wall 3, side walls 4, 5, front end-wall 6 and rear end-wall 7, all made of suitable refractory material; the furnace being encased by the sheet-metal casing 8 supported by the leg-frames 9. The side walls 4 and 5 are formed with horizontal rows of apertures for the gas burners 10 by which the chamber 1 is heated.

Mounted within the chamber 1 upon the supports 11 is the tubular retort A which is formed in four sections 12 bolted together in end-to-end relation. The retort-sections 12 and supports 11 are preferably cast from a suitable heat-resisting alloy, for example, one of the nickel-chromium-iron alloys known to the trade. The receiving end 13, Fig. 3, of the retort A projects through the front end-wall 6 of the furnace chamber and has bolted to it the shallow trough-shaped loading platform 14 the bottom and side walls of which are continuous with the bottom and side walls of the retort A. The loading platform 14 rests upon rollers 15 journaled in bearings 16 carried by the supporting rails 17 bolted to the furnace-body and to the inclined braces 18. The walls of the retort A are gas tight.

The retort is anchored at its discharge end, Figs. 1 and 2, to the bracket-supports 19 which are bolted to the bottom wall of the casing 8 over one of the leg-supports 9, the retort having a transverse rib 19' resting in corresponding grooves in the bracket-supports 19. The retort A and platform 14 are free to expand or contract relative to the heating chamber by longitudinal movement over the supports 11 and rollers 15.

An endless flexible wire-fabric belt-conveyor 20 of nickel-chromium alloy runs over the loading platform 14 and through the retort A in contact with the continuous bottom wall of said platform and retort. As the conveyor 20 issues from the discharge end of the retort, it runs over the roller 21, thence around the roller 22 and over the driving roller 23 from which it passes into the trough-support 24 which carries the return run of the belt to the slack take-up roll 25 around which the belt passes to and around the auxiliary driving roll 26 and thence around the roll 27 at the front or free end of the loading platform 14.

The slack take-up roll 25 is journaled in the side-bars 28 pivotally hung from the rod 29 carried by the rails 17. Swiveled in the lower ends of the side-bars 28, Fig. 10, is the cross-bar 30 in which is journaled the nut 31, Fig. 16, screwed onto the threaded rod 32, the eyed lower end 33 of which embraces and is anchored to the cross-rod 34 fixed to one of the leg-frames 9. The head 35 of the nut 31 is formed with recesses entered by coupling pins 36 fixed to the flange 37 screwed onto the lower end of the tube 38 which encloses the rod 32 and has a square head-piece 39 fixed to its upper end. By applying a wrench to the head-piece 39, the tube 38 may be turned to screw the nut longitudinally of the threaded rod 32, thus swinging the side-bars 28 about their pivotal support 29 and shifting the slack take-up roll 25 as desired.

The conveyor-driving roll 23 is provided on its cylindrical surface with pins 40, Fig. 6, which project into the interstices of the wire-fabric belt and cause the roll 23 to drive the belt with an effective grip. The roll 23 is fixed to the shaft 41 journaled in suitable bearing-brackets 42 and having fixed thereto the sprocket 43 which is connected by the chain 44 to the sprocket 45 on the slow-speed shaft 46' of a standard speed-reducer 46. The auxiliary conveyor-driving roll 26, Fig. 1, is fixed to the shaft 26ª connected by bevel gears 26ᵇ to the front end of the shaft 26ᶜ which is connected by bevel gears 26ᵈ to the shaft 41, carrying the main conveyor-driving roll 23. The high-speed shaft 47 of the speed-reducer 46 has fixed to it a sprocket 48 which is connected by the chain 49 to a sprocket on the output shaft 50 of a standard speed-adjuster 51. The input shaft 52 of the speed-adjuster 51 carries a pulley 53 which is driven from the motor 54 by the belt 55.

Speed-adjusters of the type shown at 51 are well known in the power-transmission art; the input shaft 52 and output shaft 50 having slidably splined thereon the pairs of pulley-cones 57 connected by the belt 58. A pair of levers 59 fulcrumed at 60 between the shafts 52, 50 and connected to the cones 57 serves to approach the cones of one pair and separate the cones of the other pair, thus changing the effective relative diameters of the pulleys and changing the speed-ratio of the shafts 50, 52. The levers 59 have nuts 61 connected to their free ends which engage the oppositely screw-threaded halves of the speed-adjusting shaft 62 which may be manually operated by any suitable means. The nuts 61 are carried by a suitable guide-rod 61'.

Speed-reducers, such as shown at 46, are also well known and comprise a casing having fixed within it a plurality of internally toothed gear-rings 63. The high-speed shaft 47 has fixed to it a pinion 64 meshing with gears 65 which turn on pins 66 carried by the disk 67; the gears 65 meshing with one of the fixed gear-rings 63. The disk 67 has fixed to it centrally, a pinion 68, similar to the pinion 64, meshing with gears 69 similar to the gears 65, carried by a disk 70, similar to the disk 67. The disk 70 carries the central pinion 71 meshing with gears 72 carried by the disk 73 fixed to the slow-speed shaft 46'. The gears 69 and 72 mesh with others of the internally toothed fixed gear-rings 63. It will be understood that with a device of this nature a considerable reduction of speed is secured between the driving shaft 47 and driven shaft 46', the ratio in the present instance being about 200:1.

The motor-speed, pulley-diameters and speed-ratios are so chosen in the present embodiment of the invention as to give a time of travel of a given point on the conveyor through the retort of from three quarters of an hour to four hours. The time may be altered beyond these limits, to suit the needs of any given class of work, by suitable selection of pulley diameters, motor-speeds, speed-reducers, adjusters etc., as will be readily understood by those skilled in the art.

Mounted above the loading platform 14, at the front end of the latter, is the hopper 73, the lower end of which is spaced somewhat above the conveyor-belt 20 and extends across the full width of the latter. A supply of finely divided material or carburizing compound $c$ is maintained in the hopper 73 by the operative in charge of the furnace. As the conveyor-belt passes slowly under the hopper 73 there is deposited on the belt a base layer $d$ of the carburizing compound which fills the interstices of the belt and covers the latter to a depth determined by the spacing of the lower end of the hopper 73 above the belt.

Spaced from the hopper 73 and disposed at the mouth of the retort A is a second hopper 74 which is also kept supplied with carburizing compound $c$ and which deposits a cover-layer $e$, Fig. 3, upon the base-layer $d$. The thickness of the cover-layer $e$ is determined by the adjustable gate 75 which partially closes or restricts the mouth of the retort A. The gate 75 is in the form of a rectangular plate which is rigidly connected at its upper edge with the upper edge of a gage-plate 76 by the cross-bar 77 threaded to receive the adjusting screw 78 journaled in the bracket 79 mounted on the hopper 74. By turning the screw 78 the gate 75 and gage 76 may be raised or lowered. The gage 76 slides in ways 80 extending between the upper end of the hopper 74 and the side-walls of the platform 14. The lower edge of the gage 76 is level with the lower edge of the gate 75 and visibly indicates the thickness of the cover-layer $e$. The operative places the work-pieces upon the base-layer $d$ in advance of the gage-plate 76 which indicates the depth to which the work-pieces are covered by the cover-layer $e$. It will be noted that the belt-conveyor 20 with the layer of material constituted by the base- and cover-layers $d$, $e$, completely seals the restricted mouth of the retort, as shown in Fig. 15, leaving a gas-space 81, Fig. 3, between the upper surface of the cover-layer $e$ and the top-wall of the retort, along which gas-space any liberated gases may pass in the direction of the arrow to the discharge end of the retort.

When the work-pieces have passed through the retort A they will have been treated or carburized to the desired extent and will fall down the slide 82 onto the traveling screen 83 through which the enveloping material or spent compound passes, leaving the work-pieces to be carried to one or the other of the quenching tanks 84, 85.

The travelling screen 83 is in the form of an endless woven-wire belt running over the spaced parallel rollers 86, 87 journaled in bearings 88, Fig. 17, fixed to the side angle-bars 89 of a frame having cross-bars 90 rigidly connecting the side-bars 89. One of the cross-bars 90 fixedly carries a pivot-pin 91 which passes through an aperture in the U-shaped screen-supporting bracket 92 bolted underneath the furnace-chamber body, Fig. 14. This pivotal support allows the screen to be swung to carry either of the two bevel gears 93 at the opposite ends of the driving-roll shaft 94 into mesh with its respective companion gear 95 on the transverse shaft 96 which is driven by the chain 97 from the shaft 98 which, in turn, is driven by the belt 99 from the shaft 52. The latches 100 retain the screen 83 in either of its working positions. The construction provides means whereby the work may be quenched in either of the quenching tanks 84 or 85, one of which may contain water and the other oil.

Journaled in bearings 101 is a belt-agitating shaft 102 to which is fixed the beater-arms 103 which vibrate the belt after it passes around the roller 21 and dislodge any spent compound which may adhere to it. The shaft 102 is driven by the chain 104 from the shaft 105 which, in turn, is driven by the three parallel belts 106 from the shaft 98; three belts being used to prevent slippage under the load imposed by the beaters 103. Suitable belt-conveyors 107 carry the quenched work out of the tanks 84, 85.

The powdered material which falls through the screen 83 and which is dislodged from the belt-conveyor 20 by the beaters 103 falls into the funnel-shaped hopper 108 which conveys it into the pit 109 from which it is removed by the elevator 110 and deposited in a receptacle 111 on the floor. The exhaust pipe 112, connected with the hopper 108, removes the dust.

The terms "finely divided", "granular" and "powdered" are not to be construed in a narrow or limited sense, as it will be obvious that the invention may be practiced with materials of various degrees of reduction within wide limits.

Having thus set forth the nature of the invention, what we claim herein is:—

1. A furnace having a retort tube, and a belt-conveyor passing through said retort tube and adapted to be buried by and convey a layer of material and buried work-pieces through said retort tube, the mouth of said retort tube being restricted in size and forming a substantially gas-tight seal with said layer of material and the discharge end of said retort tube being wide open and terminating in the heating chamber.

2. A furnace having a tubular retort closed on all sides, means for applying heat externally to said retort, a loading platform in advance of the mouth of said retort, a conveyor passing over said loading platform and through said retort, means for depositing a base-layer of material on said conveyor at the loading platform, and means for depositing a cover-layer of material upon said base-layer, said second mentioned means being separated from said first mentioned means sufficiently to expose said base-layer to the operator for deposit thereon of work-pieces.

3. In a furnace, a heated tubular retort, a conveyor adapted to pass through said retort, an adjustable gate partially closing the mouth of said retort, means associated with said gate for depositing a layer of material upon said conveyor, and a gage in advance of said means and connected with said gate to indicate the thickness of said layer of material.

4. A carburizing furnace having a tubular horizontally disposed retort with closed walls, a heating chamber surrounding said walls, means for conveying a relatively thin layer of carburizing compound and buried work-pieces through said retort, said retort having at its receiving end a mouth of restricted height forming a substantially gas-tight seal with said layer of carburizing compound.

5. A carburizing furnace having a tubular horizontally disposed retort with closed walls, a heating chamber surrounding said walls, the discharge end of said retort terminating within said heating chamber, means for conveying a relatively thin layer of carburizing compound and buried work-pieces through said retort, said retort having at its receiving end a mouth of restricted height forming a substantially gas-tight seal with said layer of carburizing compound.

6. A carburizing furnace having a tubular horizontally disposed retort with closed walls, a heating chamber surrounding said walls, the discharge end of said retort terminating within said heating chamber, means for conveying a relatively thin layer of carburizing compound and buried work-pieces through said retort, said retort having at its receiving end a mouth of restricted height forming a substantially gas-tight seal with said layer of carburizing compound and quenching means below the discharge end of said retort and external to the heating chamber.

7. A furnace having a flat tubular retort with gas tight walls including a flat bottom wall, means for applying heat externally to said retort, a flat conveyor passing through said retort, the mouth of said retort having an opening of restricted height as compared with the height of the passageway through the body of the retort, a loading platform in advance of the mouth of said retort over which the conveyor runs, said platform being continuous with the bottom wall of said retort passageway, and means for depositing carburizing compound on said conveyor in advance of the mouth of said retort, said carburizing compound forming a substantially gas tight seal at the mouth of said retort.

8. A furnace comprising a tubular retort having gas tight top, bottom and side walls, means for applying heat externally to said retort, a loading platform in advance of the entrance to said retort and the retort heating means, said platform forming an extension of the bottom and side walls of said retort, a conveyor passing over said platform and through said retort, said conveyor being of a width substantially equal to the width of the bottom wall of said retort and platform, and means for depositing carburizing compound on said conveyor in advance of said retort entrance, said carburizing compound forming a substantially gas tight seal at the mouth of said retort.

9. In a furnace, a heated tubular retort having gas tight walls and an entrance of restricted height, means for applying heat externally to said retort, a conveyor having a run passing through said retort and a return run disposed externally of said retort, and a hopper having its lower end contiguous to and in advance of the retort entrance and adapted to deposit a relatively thin layer of finely divided carburizing compound on said conveyor.

10. A continuous process carburizing furnace comprising a tubular retort having gas tight walls, means for heating said retort, and means passing through said retort for conveying a layer of carburizing compound and buried work pieces through said retort, said retort having a mouth at one end which is maintained continuously sealed by said conveying means and carburizing compound.

In testimony whereof, we have signed our names to this specification.

CHARLES T. WILLARD.
RICHARD KAIER.